US012724613B2

(12) United States Patent
McFarlin et al.

(10) Patent No.: US 12,724,613 B2
(45) Date of Patent: Sep. 1, 2026

(54) AUTOMATIC HARDWARE SPECULATION SUPPRESSION

(71) Applicant: Advanced Micro Devices, Inc., Santa Clara, CA (US)

(72) Inventors: Daniel Simon McFarlin, Santa Clara, CA (US); John Kalamatianos, Boxborough, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 52 days.

(21) Appl. No.: 18/620,068

(22) Filed: Mar. 28, 2024

(65) Prior Publication Data

US 2025/0306941 A1 Oct. 2, 2025

(51) Int. Cl.
*G06F 9/38* (2018.01)
*G06F 9/30* (2018.01)

(52) U.S. Cl.
CPC ........ *G06F 9/3842* (2013.01); *G06F 9/30058* (2013.01); *G06F 9/30145* (2013.01)

(58) Field of Classification Search
CPC .................................................... G06F 9/3842
See application file for complete search history.

(56) References Cited

U.S. PATENT DOCUMENTS

| | | | | |
|---|---|---|---|---|
| 11,029,957 | B1 * | 6/2021 | Sahita | G06F 9/30145 |
| 2010/0042771 | A1 * | 2/2010 | Kawaguchi | G06F 12/0808<br>711/E12.081 |
| 2018/0225208 | A1 * | 8/2018 | Fukuyama | G06F 9/30043 |
| 2020/0133679 | A1 * | 4/2020 | Brandt | G06F 9/3844 |
| 2021/0365554 | A1 * | 11/2021 | Sakalis | G06F 9/321 |
| 2022/0091851 | A1 * | 3/2022 | Liu | G06F 9/30087 |
| 2022/0114285 | A1 * | 4/2022 | Biernacki | H04L 9/003 |
| 2022/0206818 | A1 * | 6/2022 | Alameldeen | G06F 9/30036 |

* cited by examiner

*Primary Examiner* — Michael J Metzger
(74) *Attorney, Agent, or Firm* — Slater Matsil, LLP

(57) ABSTRACT

In some implementations, the device may include detecting a speculative load hardening indicator in a first block of code. In addition, the device may include selectively suppressing hardware speculative execution for instructions in the first block of code associated with the detected speculative load hardening indicator.

18 Claims, 8 Drawing Sheets

AUTOMATIC HARDWARE SPECULATION SUPPRESSION

TECHNICAL FIELD

The present invention relates generally to automatic hardware speculation, and, in particular implementations, to methods and systems for suppression of automatic hardware speculation in computer systems. In some implementations, methods and systems for automatic hardware speculation suppression may be utilized in computer systems executing on software that has implemented speculative load hardening language into the software program.

BACKGROUND

As software programs become larger and more complex in functionality computer systems have evolved to perform various optimization techniques to reduce the time required to read and execute on these software programs. One such optimization technique is speculative execution, in which a computer system concurrently while executing the known instruction in the software program also executes an unknown instruction in the software program so as to reduce delay when the unknown instruction becomes known by having the previously unknown instruction recorded and ready to be executed.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
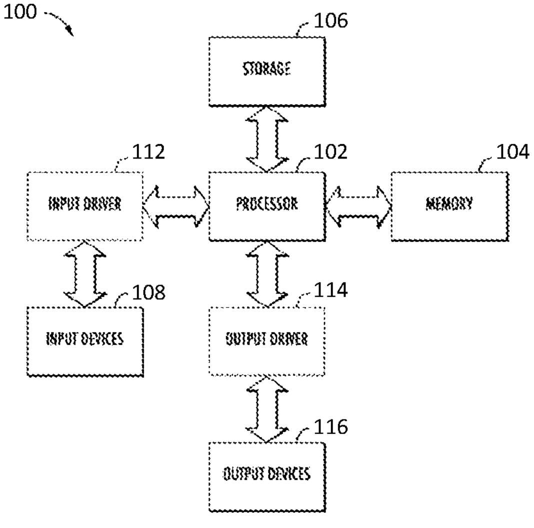
FIG. 1 illustrates an example of a block diagram depicting components within an example device of a computing system.

Corresponding numerals and symbols in the different figures generally refer to corresponding parts unless otherwise indicated. The figures are drawn to clearly illustrate the relevant aspects of the implementations and are not necessarily drawn to scale. The edges of features drawn in the figures do not necessarily indicate the termination of the extent of the feature.

DETAILED DESCRIPTION OF ILLUSTRATIVE EXAMPLES

The making and using of the presently disclosed examples are discussed in detail below. It should be appreciated, however, that the present invention provides many applicable inventive concepts that can be embodied in a wide variety of specific contexts. The specific examples discussed are merely illustrative of specific ways to make and use the invention, and do not limit the scope of the invention. Throughout the discussion herein, unless otherwise specified, the same or similar reference numerals or labels in different figures refer to the same or similar component or signal.

In some implementations, speculative execution is undesirable, in such implementations programmers may utilize speculative load hardening techniques within their program to restrict speculative execution. In some implementations where speculative load hardening has been implemented within a program, the speculative load hardening can be performed automatically by a compiler. Additionally, in some implementations, the speculative load hardening can be restricted to small segments of the program based on directives implemented into the program. In implementations where the speculative load hardening has been restricted to small segments of the program by directives within the program not all instructions typically utilized for speculative load hardening (e.g., conditional move (cmov) instructions) are actually utilized for speculative load hardening purposes within the program globally.

The present disclosure will be described with respect to examples in a specific context, namely various systems and associated process flows for detecting sensitive load data within localized regions of a software code so as to suppress hardware speculative execution on a local level within an executed program, as opposed to globally suppressing hardware speculative execution, will be used as examples in the discussion herein. Skilled artisans will readily appreciate that the principle and processes disclosed herein processes may be applied in combinations, and concurrently throughout the software in an out of order approach.

In general, software must be loaded into storage (e.g., memory) where ultimately hardware is able to execute upon the instructions provided by the software. This process typically involves converting the instructions provided by the software in a high-level language into a low-level language (e.g., high-level languages such as C, C++, C#, Java, Python, etc. are compiled into machine code or assembly language) usually through the use of a compiler, into a series of individual statements containing instructions, potentially in the form of machine code. The hardware is then able to fetch each statement from storage, decode the instructions within the statement, and execute the operation provided by the instructions. These instructions may drive operations such as computations, moving data, or altering the order in which instructions are executed upon. This process follows a type of fetch-decode-execute cycle (or instruction cycle), which when carried out sequentially can cause the runtime of software to become unnecessarily burdensome. Therefore, to increase the operation speed for which a program may be executed upon various optimization techniques may be employed. These techniques may include executing the instruction cycle concurrently on within a block (discussed in greater detail below) of the software, or executed in parallel through an instruction pipeline approach, where the next instruction may begin to be processed before the previous instruction has been executed.

Some instructions within a program may be conditional instructions, where the following instruction is dependent on whether the condition of the conditional instruction is met or not. This type of conditional instruction may be a conditional branch instruction. To improve the efficiency and overall runtime of a program processors may be developed that upon identifying a conditional branch instruction, the processor rather than waiting for the previous instructions to provide the condition, the processor will make a prediction on the branch condition and execute on the conditional branch instruction based on the predicted branch condition and load instructions following the predicted branch. This process is a form of hardware implemented optimization referred to as hardware speculative execution. If the processor makes a correct prediction as established by the execution of the previous instructions, the conditional branch instruction has already been executed and the conditional branch instructions are already loaded thereby saving time by not having to wait for the condition to be met. If the predicted branch condition does not match the executed branch condition, then the loaded instructions are discarded and no additional time over the time to re-fetch on the right path has been lost.

However, a security issue arises when the subject load of a conditional branch contains sensitive data. During hardware speculative execution the subject load data of a conditional branch generated by a predicted branch condition is held in memory while the hardware executes the previous instructions to determine if the predicted branch condition is valid. During this time period, the subject load data held in memory may be at risk of being maliciously or undesirably copied. The unintended replication of the subject load data may be particularly detrimental if the subject load data contains sensitive information. To mitigate the risk of unintended replication of sensitive data held in memory, many software developers have implemented specific code language that helps safeguard this sensitive data from a software instruction based approach. Two primary methods have been implemented as various forms referred to as speculative load hardening. The first approach is to include a conditional move instruction where the conditional move instruction only executes if the branch mispredicts, where execution of the conditional move instruction sets the address to zero. In implementations, where the conditional move instruction executes setting the address to zero the load from memory is discarded as zero is an invalid address. The other approach is to include a fence instruction which requires instructions to be carried out in a specific order and puts a constraint on out of order execution operations to prevent the sensitive load data from being stored in memory before the condition is met.

However, both of these approaches are still vulnerable to hardware speculative execution which searches for these conditional branches to make a predictive condition to execute upon the conditional branch to maintain maximum efficiency in processor operations. However, simply eliminating the utilization of hardware speculative execution across an entire program would significantly hinder the processing capabilities of the hardware being utilized to run such programs and drastically increase the runtime of the program to reach completion. Therefore, there are significant benefits in being able to identify when and where within a program's software it is appropriate to run hardware speculative execution to maintain optimal processing speeds and when and where within a program's software it is appropriate to suppress hardware speculative execution to provide desired security for sensitive load data.

The following description discusses various systematic approaches towards automatically suppressing hardware speculative execution functions within a system that is executing a program for localized blocks of code within the software that have been denoted as containing sensitive load data.

FIG. 1 illustrates an example of a block diagram of an example device 100 in which one or more features of the disclosure can be implemented. The device 100 can include, for example, a computer, a gaming device, a handheld device, a set-top box, a television, a mobile phone, server, a tablet computer, or other types of computing devices. The device 100 may comprise of a processor unit 102, a memory unit 104, a storage unit 106, one or more input devices 108, and one or more output devices 116. The device 100 can also optionally include an input driver 112 and an output driver 114. It is understood that the device 100 can include additional components not shown in FIG. 1.

In various alternatives, the processor unit 102 may include a central processing unit (CPU), a graphics processing unit (GPU), a CPU and GPU located on the same die, or one or more processor cores, wherein each processor core can be a CPU or a GPU, microprocessors, processors with multiple execution units, concurrent computation processors, the like, or a combination thereof. In various alternatives, the memory unit 104 is located on the same die as the processor unit 102, or is located separately from the processor unit 102. The memory unit 104 may include a volatile or non-volatile memory, for example, random access memory (RAM), dynamic RAM, or a cache.

The storage unit 106 may include a fixed or removable storage, for example, a hard disk drive, a solid-state drive, an optical disk, or a flash drive. The input devices 108 may include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless signals). The output devices 116 may include, without limitation, a display, a speaker, a printer, a haptic feedback device, one or more lights, an antenna, or a network connection (e.g., a wireless local area network card for transmission and/or reception of wireless signals).

The input driver 112 communicates with the processor unit 102 and the input devices 108, and permits the processor unit 102 to receive input from the input devices 108. The output driver 114 communicates with the processor unit 102 and the output devices 116, and permits the processor unit 102 to send output to the output devices 116. It is noted that the input driver 112 and the output driver 114 are optional components, and that the device 100 will operate in the same manner if the input driver 112 and the output driver 114 are not present.

Figure 2:
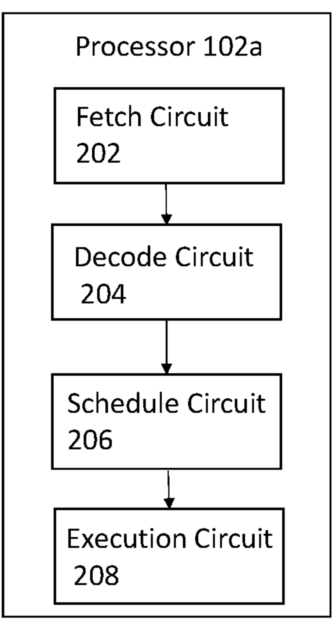
FIG. 2 illustrates an example of a block diagram depicting an example of a processor that may be utilized within the example device for the computing system.

FIG. 2 illustrates an example of a block diagram of an example processor core **102*a* that may operate as one of the cores within the processor 102. In an implementation, the processor 102*a* may receive information from the input devices 108, through for example the input drive 112, and processes that information into either the memory 104 or the storage 106, or as executable commands for the output devices 116, through for example the output driver 114. In an implementation, the processor 102*a* may comprise of a fetch circuit 202, a decode circuit 204, a schedule circuit 206, and an execution circuit 208. The fetch circuit 202, also referred to as an instruction unit, controls the information (e.g., individual instructions) from a program (e.g., software 302) to be fetched from memory (e.g., the memory 104) as well as the order in which this information is fetched from memory to be executed upon. In an implementation, the decode circuit 204 receives specific information (e.g., specific instructions) from the fetch circuit 202 in which a control unit of the decode circuit 204 interprets the information and determines which information signals need to be sent to the execution circuit 208 for execution. In an implementation, the control unit of the decode circuit 204 sends the interpreted information (i.e., decoded information) to the schedule circuit 206 where a control unit of the schedule circuit 206 determines the order and time that the decoded information is executed upon by the execution circuit 208. In an implementation, the schedule circuit 206 may hold the decoded information to be executed at a later time (e.g., following the execution of other decoded information, i.e., other decoded instructions). In this way, the schedule circuit 206 may cause the information received from the program to be executed out-of-order, concurrently or to not be executed upon at all. In an implementation, the execution circuit 208 receives decoded instructions from either directly the decode circuit 204, or from the schedule circuit 206 in the form of control signals, these control signals are then processed by the execution circuit 208 to relevant function units to carry out (i.e., execute) the instructions. The functions performed by the processor 102***a* may be performed repeatedly to processes dictated by the program (e.g., the software 302) and may also be performed in conjunction with other processors (e.g., the processors 102).

Figure 3:
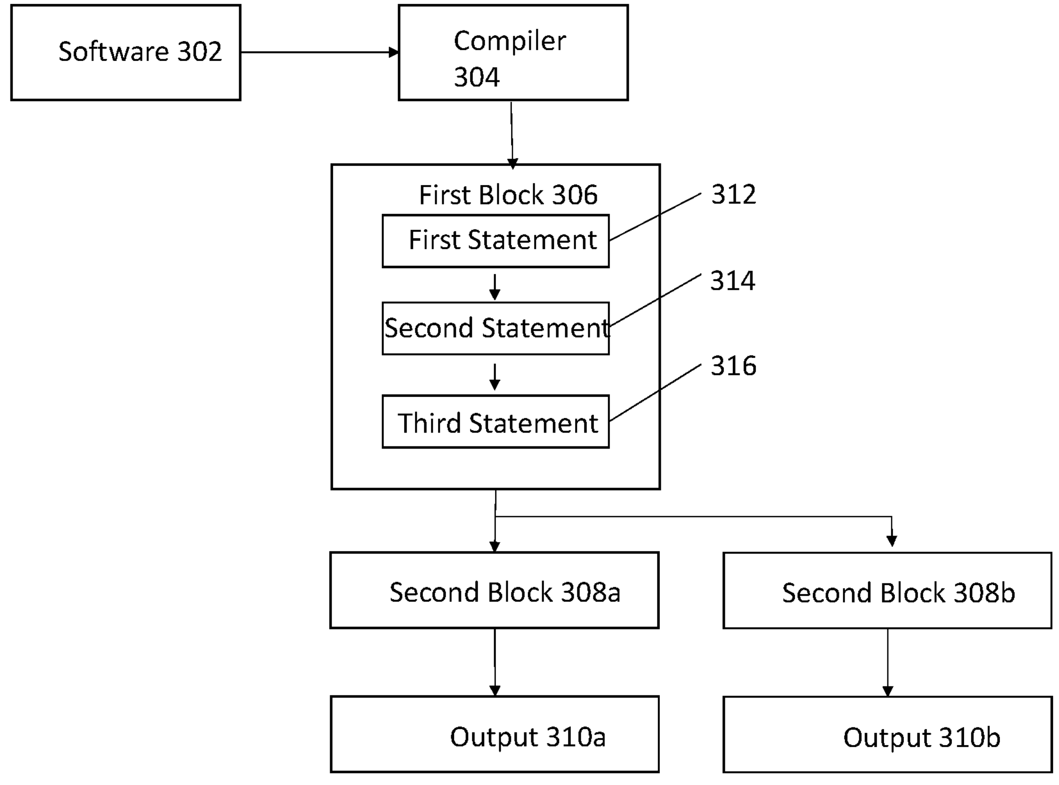
FIG. 3 illustrates an example of a block diagram of a program that may be processed by the example device within the computing system.

FIG. 3 illustrates an example of a block diagram of an example of a portion of a program (e.g., the software 302) information being broken down into instruction statements that may be executed upon by the processor 102*a*. In an implementation, the software 302 provides the source code (i.e., source language) from a program operating on the device 100. In an implementation the source code from the software 302 may be in the form of a high-level programming language that, for example, utilizes variables, arrays, boolean expressions, etc. to form functions, subroutines, loops, locks, etc. In an implementation, a compiler 304 may be utilized to translate the source code from the software 302 from a high-level programming language to that of a low-level programming language (i.e., target language), for example, into assembly language, object code, or machine code. The low-level programming language may then be in a state to be executed on (i.e., an executable program) by the processor 102 (e.g., the processor 102*a*).

In an implementation, the target language may be organized into basic blocks, for example first block 306, second block 308, and many additional blocks (e.g., third block, fourth block, etc.) not separately illustrated. In an implementation a basic block is a straight-line code sequence comprising of one or more statements, for example, first statement 312, second statement 314, third statement 316, etc. Each individual statement may operate as a specific instruction that expresses an action to be executed by the processor 102. In a basic block, each statement typically dominates in its position and executes before all statements in later positions. A basic block typically has one entry point into the straight-line code sequence and one exit point out of the straight-line code sequence. In an implementation, the entry point into the basic block may be referred to as a leader of the basic block, wherein the leader may be the first statement within the basic block, the target of a conditional or unconditional move statement, or the statement in the position that immediately follows a conditional or unconditional move statement. In an implementation, the exit point out of the basic block that ends the basic block comprises unconditional and conditional branch statements, return statements, exception throwing statements, and terminal function statements.

FIG. 3 illustrates, as an example, an implementation in which the third statement 316 of the first block 306 is an exit point in the form of a conditional branch statement. In this implementation, depending on the condition loaded into the third statement 316 (e.g., for example from the previous second statement 314, or from the decode circuit 204 of the processor 102*a*) the software 302 may produce an entry point that progresses the program along any number of the second blocks 308 (e.g., second block 308*a*, second block 308*b*, etc.) that may ultimately lead to the various outputs 310 for the software 302 (e.g., output 310*a*, output 310*b*, etc.). The resulting output 310 may then serve as control signals sent to the relevant functional units to perform an intended function (e.g., through the output driver 114 to the output devices 116).

Figure 4:
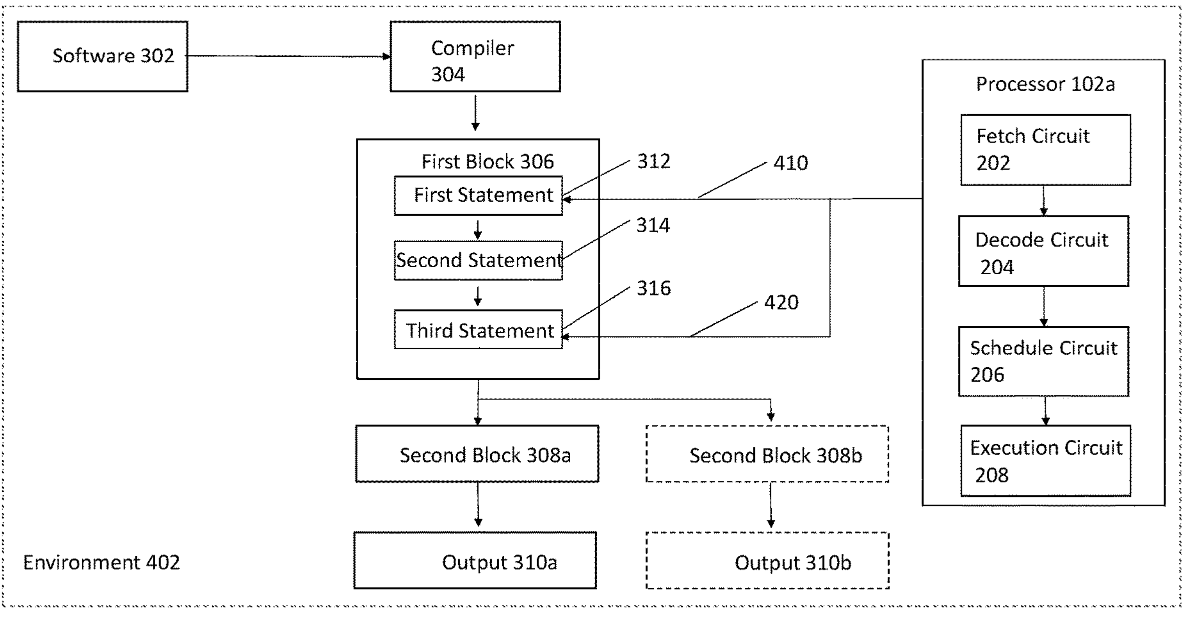
FIG. 4 illustrates an example of a process flow diagram depicting how the processor of the example device may evaluate and execute upon the program being processed by the computing system.

FIG. 4 illustrates, as an example, a process flow diagram in which the processor 102*a* may execute upon the software 302 to produce the output 310. In an implementation, the processor 102*a* may interact with the target language through an instruction cycle 410. The instruction cycle 410 may be performed by one or more processors and may follow the operation of fetch-decode-execute cycle. In an example of a fetch-decode-execute cycle, during a fetch stage, executed for example by the fetch circuit 202, a first register, which may be referred to as a program counter (PC) register holds a memory address of a first instruction to be executed (e.g., the first statement 312), the memory address of the first instruction may during the fetch stage be copied to a second register which may be referred to as a memory address register (MAR), the PC register may then be stepped to the memory address of the next sequential instruction (e.g., the second statement 314). At this point during the fetch stage, a processor may take the instruction (e.g., the first statement 312) held by the MAR and copies it into a memory data register (MDR), the MDR may also hold instructions to be stored in memory. The instruction in the MDR may then be copied into a current instruction register (CIR) which serves to hold the instruction having been fetched from memory. In an implementation, during a decode stage, executed by for example a decode circuit 204, the control unit (CU) of the decode circuit 204 will decode the instruction (e.g., the first statement 312) being held by the CIR. Following the decode stage, the CU of the execution circuit 208, may take the decoded instruction and send the corresponding signals derived from the instruction to other components (e.g., arithmetic logic units (ALU), floating point units (FPU), etc.) for execution. In an implementation, during the fetch stage, the fetch-decode-execute cycle repeats with the next instruction (e.g., the second statement 314) following the memory address of the first instruction being copied to the MAR such that the processor 102 fetches, decodes, and executes the statements in the basic block sequentially. In an implementation, the instruction cycle 400 may be carried out repeatedly, processing through the various basic blocks within the software 302 (e.g., the first block 306, the second block 308, the third block, etc.), until the output 310 of the software 302 is ultimately reached and executed upon by the device 100.

In an implementation, to improve runtime, the processor 102*a* may concurrently with the standard sequential fetch-decode-execute cycle (e.g., the instruction cycle 410) employ a hardware speculative execution process 420. In this implementation of the hardware speculative execution process 420, the processor running the fetch-decode-execute cycle, or a different processor altogether may evaluate the basic block (e.g., the first block 306) to detect if a conditional branch instruction is present (e.g., third statement 316), the processor 102*a* may then predict and record a value for the branch condition, often based on previous branch conditions, and execute subsequent instructions (e.g., statements in the second block 308) based on the predicted branch condition and record the ultimate instruction derived from the predicted branch condition. In an implementation, the part of the processor 102*a* that detects the conditional branch instruction during the hardware speculative execution process 420 is the decode circuit 204. In an implementation, the decode circuit 204 may predict a branch condition and then pass this information onto the schedule circuit 206 where the schedule circuit 206 may hold this information or pass it onto the execution circuit 208.

In one implementation of the hardware speculative execution process 420, once the fetch-decode-execute cycle (e.g., the instruction cycle 410) reaches the conditional branch instruction (e.g., the third statement 316), if the execute instruction value is equal to the predicted branch condition previously executed, the previously executed instructions (e.g., the second block 308) resulting from the branch prediction has already been executed, significantly reducing the runtime of the software 302 such that the output 310 may be produced as quickly and efficiently as possible.

In an implementation, the hardware speculative execution process 420 through the use of the decode circuit 204 may predict and load multiple predicted branch conditions. In this implementation, the hardware speculative execution process 420 may predict and load a predicted branch condition that matches the branch condition determined through the instruction cycle 410 progressing the program through the correct second block 308*a* reaching the desired output 310*a*, but also may mispredict and load a mispredicted branch condition that undesirably loads instructions for the undesired second block 308*b*. In this implementation, the load instructions for the mispredicted second block 308*b* are discarded upon the processors 102*a* determining the conditional value and the predicted value do not match. Through the hardware speculative execution process 420, the prediction on the conditional branch instruction is either correct (whether in implementations where only one branch condition is predicted and it has a true value with the actual branch condition, or in implementations where multiple or all branch conditions are predicted) and the runtime of the software is significantly improved by preloading the instructions for the second block 308, or in the instance of a misprediction, where no predicted condition is true, then no load time is actually lost over the standard instruction cycle 410.

The hardware speculative execution process 420 significantly decreases the runtime of the software 302 and increases the efficiency of the processor 102 in executing the software 302. However, there are instances in which the hardware speculative execution process 420 is undesirable. For example, instructions and resulting outputs contained within specific blocks (e.g., the second block 308) may contain sensitive information that may be vulnerable to attack such as side-channel attacks. To mitigate the risk of such attacks on sensitive information, many compilers (e.g., the compiler 304) may include instructions within the target language of the software 302 to prevent the loading of sensitive data on a conditional branch before the previous instructions leading to the branch condition being met have been executed. This software-side approach to reduce the risk of loading sensitive data onto memory may be referred to as speculative load hardening. However, hardware speculative execution may unintentionally undermine these mitigation efforts if applied globally to the target code.

Therefore, advantages may be achieved by employing the hardware speculative execution process 420 that is able to differentiate between desirable conditions to perform the hardware speculative execution process on specific blocks of the source code without sensitive information to improve the runtime and efficiency of the software 302 and, alternatively, automatically suppress the hardware speculative execution process 420 on specific blocks of the source code containing sensitive information to maintain desirable levels of security during the execution of the software 302.

Further, in FIG. 4, the software 302 and the processor 102*a* are depicted within an environment 402. In an implementation, the environment 402 is illustrative of the network that the software 302 is being executed in. In an implementation, the environment 402 may be an open network where devices other than the example device 100 may interact and communicate with the example device 100. In another implementation, the environment 402 may be a type of secure network. Secure networks may have varying levels of security, local networks may have a controlled number of devices that may interact and communicate with each other, including with the example device 100. Within a local network the environment may be within a network enclave which is an isolated section of the local network (or internal network). There are various methods of establishing the network enclave to isolate the example device 100 from communicating with other devices, some example methods internal firewalls, network admission controls, virtual local area network configurations, and virtual private network configurations. Another form the environment 402 may operate within is a completely isolated environment in which the example device 100 is not connected to any network and therefore has no communicate with external devices. The type of environment 402 that the device 100 is executing the software 302 in may influence the need or lack thereof for additional security measures, such as speculative load hardening language (e.g., speculative load hardening code) and suppression of the hardware speculative execution process 420.

Figure 5:
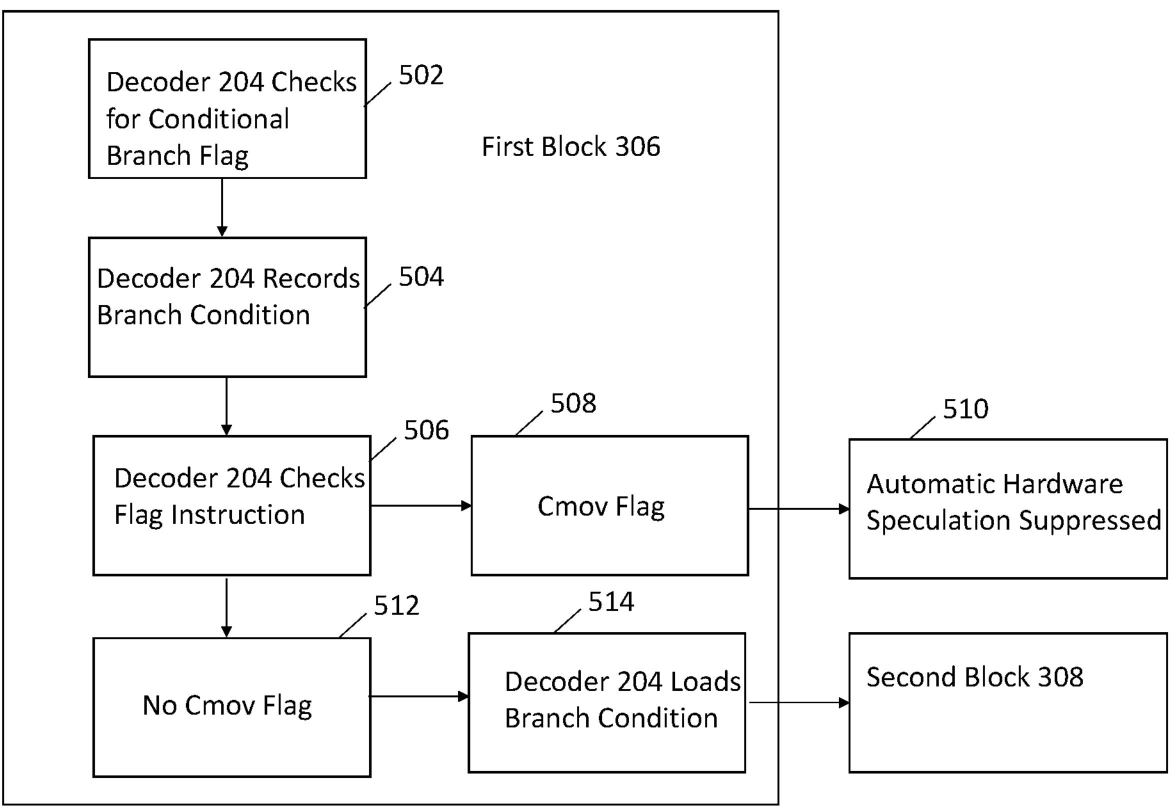
FIGS. 5 and 6 illustrate various flow diagrams of the processor systematically evaluating a block of source code for indicators of speculative load hardening to automatically trigger hardware speculation suppression during the execution of a speculative load hardened block of source code.

FIG. 5 illustrates a flow diagram depicting a process for the processor 102 to detect one implementation of speculative load hardening implemented in a block of source code block (e.g., the first block 306). In FIG. 5, the process is operating on the condition that the software 302 being executed upon is utilizing conditional move instructions as the form of speculative load hardening to indicate the presence of sensitive load data, which may be isolated to a specific basic block in which the conditional move instruction is implemented in (e.g., the first block 306).

In an implementation, in step 502, the decode circuit 204 for the processor 102 checks the source code block to detect any conditional branch flags for which hardware speculative execution may be performed on. If no conditional branch is detected within the first block 306 for which hardware speculative execution may be performed on, then the processor 102 may halt this process and begin executing this process on a subsequent block, (e.g., the second block 308) following the process flow as described below with respect to FIG. 5.

In an implementation, if in step 502 the decode circuit 204 finds a conditional branch for which hardware speculative execution may be performed on within the first block 306, the processor 102 may proceed to step 504. In step 504, the decode circuit 204 records (stores) the predicted branch condition. The predicted branch condition may be stored in any suitable computer-readable storage medium, including in a register, computer-readable memory, or the like. In an implementation, the decode circuit 204 records the predicted branch condition into a memory address register (MAR). In step 506, the decode circuit 204 checks the next flag consuming instruction to determine if speculative load hardening has been implemented in the source code for the first block 306. If in step 506 the decode circuit 204 identifies speculative load hardening indicators (e.g., identifies a conditional move instruction flag), the processor 102 proceeds to step 508. In step 508, a conditional move (Cmov) instruction flag indicates the implementation of speculative load hardening within the source code of the first block 306. In an implementation, if the recorded predicted branch condition matches the condition of the Cmov, then the Cmov is marked as no-speculate and is executed sequentially through the fetch-decode-execute cycle. In an implementation, if the recorded predicted branch condition does not match the condition of Cmov, then the Cmov instruction overwrites the address of the MAR holding the current recorded predicted branch condition to point to a zero address, and since the zero address is invalid no data is loaded on a branch misprediction. In both implementations, the Cmov instruction flag in step 508 indicates speculative load hardening in the source code of the software 302 in the first block 306 which initiates step 510. In step 510, the indication of the Cmov instruction flag in step 508 indicates the utilization of speculative load hardening within the source code of the first block 306 and therefore the intent to protect sensitive data that may be loaded on the conditional branch within the first block 306, this indication is relayed back to the processor 102 as an instruction to automatically suppress hardware speculative execution.

In an implementation, if in step 506 no Cmov instruction flag is identified, then in step 512 this method of speculative load hardening may not be implemented in the source code of the first block 306 and hardware speculative execution may be employed by the processor 102. In step 514, the decode circuit 204 may load the predicted branch condition so that subsequent instructions in the second block 308 may be executed concurrently during the fetch-decode-execute cycle being run on the first block 306.

By detecting sensitive load data within localized regions of a software code (e.g., the software 302) so as to suppress the hardware speculative execution process 420 on a local level within an executed program as opposed to globally suppressing hardware speculative execution, the disclosed implementations improve the operation of the processor and/or computing system. For example, the conventional approach of simply eliminating the utilization of hardware speculative execution across an entire program significantly hinders the processing capabilities of the computing system being utilized to run such programs and drastically increases the runtime of the program to reach completion. Thus, the disclosed implementations have significant benefits in being able to identify when and where within a program's software it is appropriate to run hardware speculative execution to maintain optimal processing speeds and when and where within a program's software it is appropriate to suppress hardware speculative execution to provide desired security for sensitive load data. These improvements also apply to the subsequently disclosed implementation of FIGS. 6 through 8.

Figure 6:
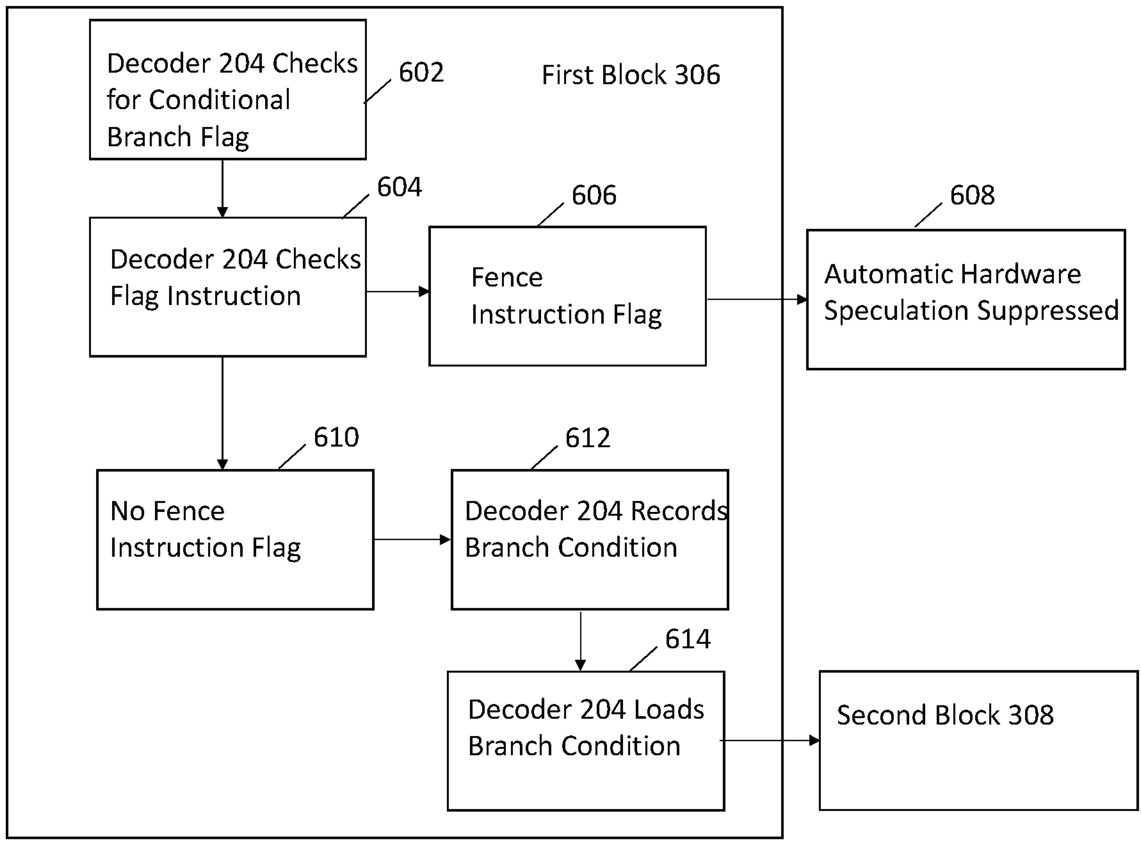

FIG. 6 illustrates a flow diagram depicting a process for the processor 102 to detect another implementation of speculative load hardening implemented in a block of source code (e.g., the first block 306). In FIG. 6, the process is operating on the condition that the software 302 being executed upon is solely utilizing fence instructions as the form of speculative load hardening to indicate the presence of sensitive load data, which may be isolated to a specific basic block in which the fence instruction is implemented in (e.g., the first block 306).

In an implementation, in step 602, the decode circuit 204 for the processor 102 checks the source code of the first block 306 to detect any conditional branch flags for which hardware speculative execution may be performed on. If no conditional branch is detected within the first block 306 for which hardware speculative execution may be performed on, then the processor 102 may terminate this process and begin executing this process on a subsequent block, (e.g., the second block 308) following the process flow as described below with respect to FIG. 6.

In an implementation, if in step 602, the decode circuit 204 finds a conditional branch for which hardware speculative execution may be performed on within the first block 306, the processor 102 may proceed to step 604. In step 604, the decode circuit 204 checks the next flag consuming instruction to determine if speculative load hardening has been implemented into the source code of the first block 306. If in step 604, the decode circuit 204 detects a fence instruction flag (e.g., a speculative load hardening indicator), this may indicate the implementation of speculative load hardening within the source code of the first block 306. In step 606, the fence instruction indicates the implementation of speculative load hardening. A fence instruction, also known as a memory barrier, membar, or memory fence, is a type of barrier instruction that forces memory operations resulting from instructions issued before the barrier instruction to be executed before memory operations from instructions issued after the barrier instruction. In step 608, the indication of the fence instruction flag in step 606 suggests the utilization of speculative load hardening and therefore the intent to protect sensitive data that may be loaded on the conditional branch, this indication is relayed back to the processor 102 as an instruction to automatically suppress hardware speculative execution.

In an implementation, if no fence instruction flag is identified in step 604, then in step 610, this method of speculative load hardening does not appear to be implemented in the source code of the first block 306 indicating that hardware speculative execution may be employed by the processor 102. In step 612, the decode circuit 204 records a predicted branch condition. The predicted branch condition may be stored in any suitable computer-readable storage medium, including in a register, computer-readable memory, or the like. In an implementation, the decode circuit 204 records a predicted branch condition into the MAR. In step 313, the decode circuit 204 loads the predicted branch condition so that subsequent instructions in the second block 308 may be executed concurrently during the fetch-decode-execute cycle being run on the first block 306.

Figure 7:
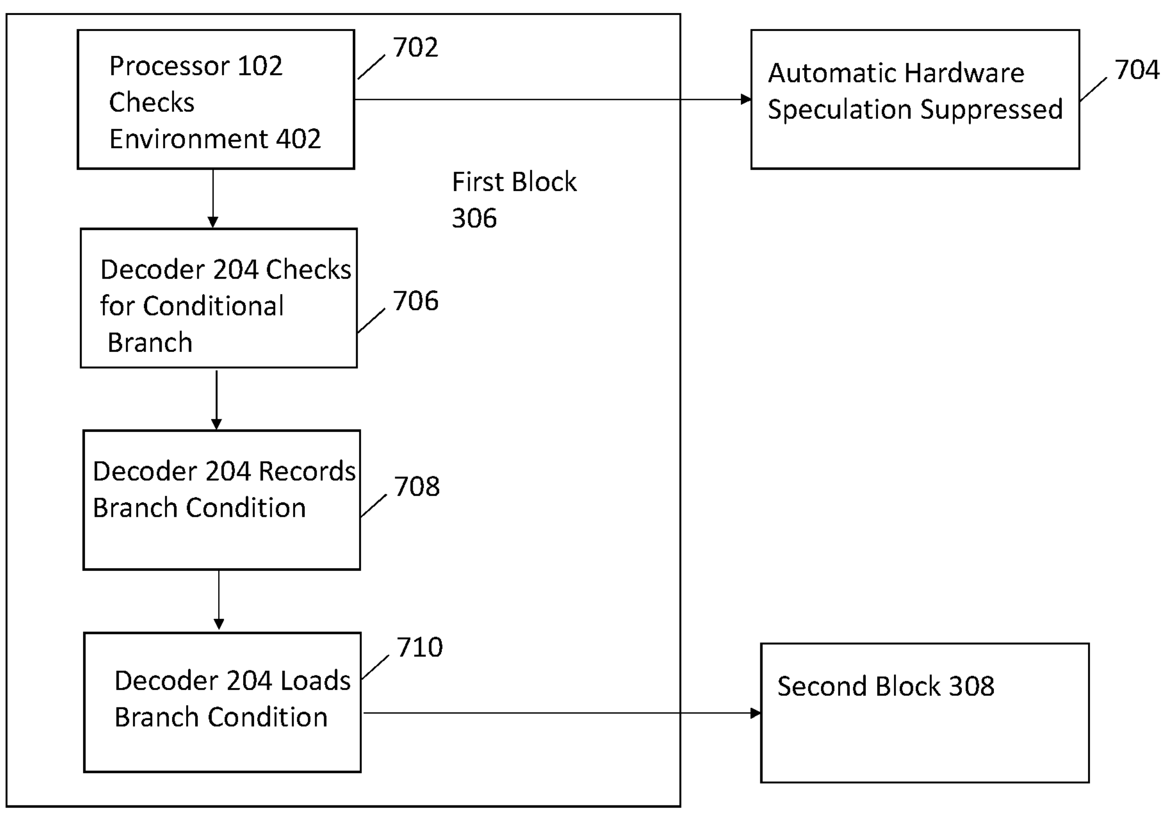
FIG. 7 illustrates a flow diagram of the processor systematically evaluating an environment the source code is being executed in to determine the necessity for automatic hardware speculation suppression during the execution of the source code.

FIG. 7 illustrate a flow diagram depicting a process for the processor 102 to detect the environment 402 in which the software 302 is being run in to determine if speculative load hardening may be redundant. In FIG. 7, the process is operating on the condition that any speculative load hardening utilized within the software 302 being executed upon is unknown, and hardware speculative execution may be employed to a specific basic block (e.g., the first block 306) if the specific block is isolated within a secure environment.

In an implementation, in step 702, the processor 102 checks the environment 402 that first block 306 of the software 302 is being run in. If the processor 102 detects that the first block 306 is being run in a secure environment, such as within an isolated network, a private network, or a secure enclave, then the need for speculative load hardening protection is redundant and impedes the efficiency and runtime of the software 302. Alternatively, if the environment 402 that the first block 306 is being run in is in an unsecure environment, then the sensitive data loaded during automatic hardware speculation may be at risk. In step 704, if the processor 102 detected that the environment 402 is an unsecure environment, then this information is relayed to the processor 102 and hardware speculative execution is automatically suppressed.

In an implementation, if in step 702 the processor 102 detects that the environment 402 that the source code of the first block 306 is being run in is a secure environment, then the processor 102 may proceed to step 706. In step 706 the decode circuit 204 of the processor 102 checks for conditional branch instructions flags for which hardware speculative execution may be performed on. If no conditional branch is detected within the first block 306 for which hardware speculative execution may be performed on, then the processor 102 may halt this process and begin executing this processes on a subsequent block, (e.g., the second block 308) following the process flow as described below with respect to FIG. 4. It should also be noted, that while FIG. 4 depicts step 702, where the processor 102 determines the security of the environment 402 that the source code of the first block 306 is being run in, this is merely one implementation, and in another implementation step 706, where the decode circuit 204 of the processor 102 checks for conditional branch instructions flags for which hardware speculative execution may be performed on may be carried out before step 702.

In an implementation, if in step 706, the decode circuit 204 finds a conditional branch for which hardware speculative execution may be performed on within the first block 306, the processor 102 may proceed to step 708. In step 708, the decode circuit 204 records a predicted branch condition. In step 710, the decode circuit 204 loads the predicted branch condition so that subsequent instructions in the second block 308 may be executed concurrently during the fetch-decode-execute cycle being run on the first block 306.

Figure 8:
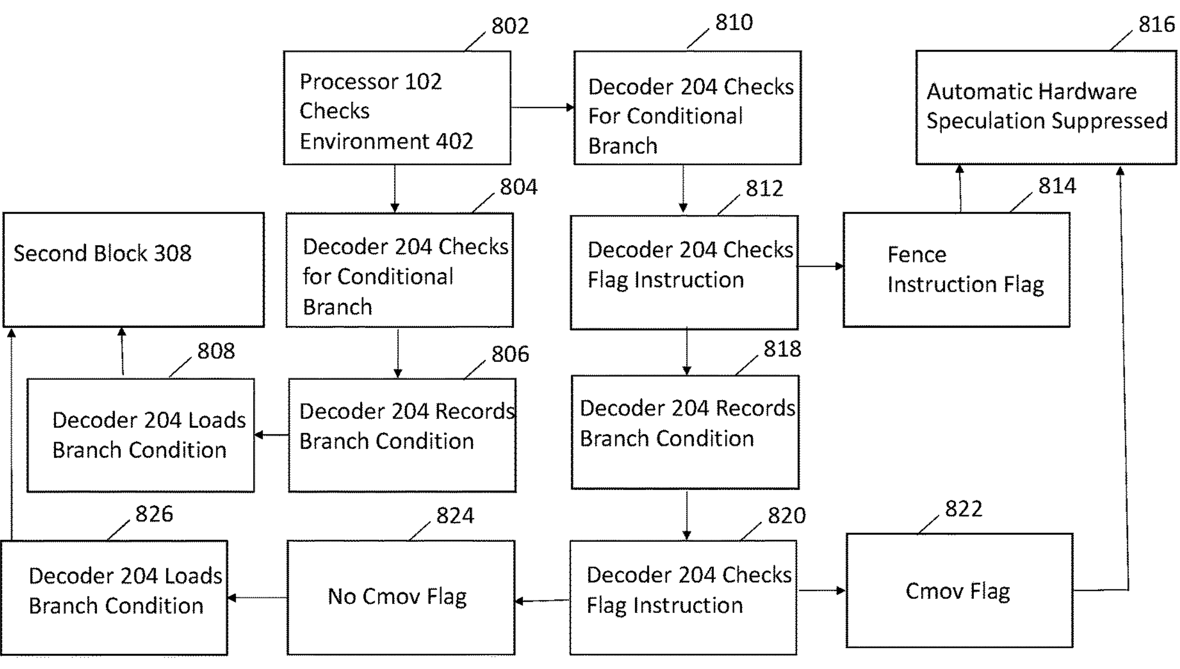
FIG. 8 illustrates a flow diagrams in which the processor both evaluates the environment the source code is being executed in as well as the presence of speculative load hardening within blocks of the source code that would automatically trigger hardware speculation suppression within the speculative load hardened blocks of source code.

FIG. 8 illustrates a flow diagram depicting a process for the processor 102 to detect not only the environment 402 that the source code of the software 302 is running in for the first block 306, but also the presence of either fence instruction flags as well as conditional move instruction flags that may indicate the utilization of speculative load hardening within the first block 306 suggesting the need to protect sensitive data from being loaded.

In this implementation, the processor 102 starts with step 802, in which the processor 102 checks the environment 402 that the source code is being run in for the first block 306. If in step 802, the processor 102 detects that the environment 402 is a secure environment, such as operating in an isolated network, or running in a secure enclave, the processor 102 may skip steps relating to detecting the utilization of speculative load hardening within the source code of the first block 306 as the use of speculative load hardening does not add any additional functional security protections and the suppression of hardware speculative execution increases the runtime for running the source code for the first block 306 and decreases the potential efficiency of the processor 102 running the source code of the first block 306. In this implementation, if in step 802 the processor 102 determines that the environment 402 that the first block 306 is operating in is a secure environment, the processor 102 may proceed to step 804. In step 804, the decode circuit 204 of the processor 102 checks for conditional branches within the source code of the first block 306 for which hardware speculative execution may be performed on. If in step 804, the decode circuit 204 finds a conditional branch for which hardware speculative execution may be performed on, the processor 102 may proceed to step 806. In step 806, the decode circuit 204 records a predicted branch condition. The predicted branch condition may be stored in any suitable computer-readable storage medium, including in a register, computer-readable memory, or the like. In an implementation, the decode circuit 204 records a predicted branch condition into a MAR. In step 808, the decode circuit 204 may then load the predicted branch condition, so that subsequent instructions in the second block 308 may be executed concurrently during the fetch-decode-execute cycle being run on the first block 306.

In an implementation, if in step 802, the processor 102 detects that the environment 402 that the first block 306 is operating in is not a secure environment, the processor 102 may proceed to step 810. In step 810, the decode circuit 204 of the processor 102 checks for conditional branches within the source code of the first block 306 for which hardware speculative execution may be performed on. It should be noted that the process flow described above illustrates step 802 in which the processor 102 determines the security of the environment 402 that the source code of the first block 306 is operating in before proceeding to either step 804 or step 810, where the decode circuit 204 of the processor 102 in both steps checks for conditional branches within the source code of the first block 306 for which hardware speculative execution may be performed on. This is merely one implementation, and in another implementation, the decode circuit 204 of the processor 102 checks for conditional branches within the source code of the first block 306 for which hardware speculative execution may be performed on before the processor 102 determines the security of the environment 402 that the source code of the first block 306 is operating in. If no conditional branch is detected within the first block 306 for which hardware speculative execution may be performed on, then the processor 102 may halt this process and begin executing this processes on a subsequent block, (e.g., the second block 308) following the same processes flow as described with respect to FIG. 5.

In an implementation, following step 810, where the decode circuit 204 of the processor 102 checks for conditional branches, if a conditional branch is found within the source code of the first block 306 that hardware speculative execution may be performed on the processor 102 may proceed to step 812. In step 812, the decode circuit 204 checks the next flag consuming instruction to determine if speculative load hardening has been implemented into the source code of the first block 306 in the form of a fence instruction flag. If in step 812, the decode circuit 204 detects a fence instruction flag, this may indicate the implementation of speculative load hardening within the source code of the first block 306. In step 814, the fence instruction flag indicates the implementation of speculative load hardening that forces memory operations resulting from instructions issued before the barrier instruction to be executed before memory operations from instructions issued after the barrier instruction. In step 814, the presence of a fence instruction flag indicates the intent to protect sensitive data that may be loaded on the conditional branch, this indication is relayed back to the processor 102 in step 816 as an instruction to automatically suppress hardware speculative execution.

In an implementation, if in step 812 no fence instruction flag was identified the processor 102 may proceed to step 818. In step 818, the decode circuit 204 records the predicted branch condition into an MAR. In step 820, the decode circuit 204 checks the next flag consuming instruction to determine if speculative load hardening has been implemented into the source code for the first block 306 in the form of a conditional move instruction flag. If in step 820 the decode circuit 204 identifies a conditional move instruction flag, the processor 102 proceeds to step 822. In step 822, the conditional move flag (Cmov) instruction flag indicates the implementation of speculative load hardening within the source code of the first block 306. In an implementation, if the recorded predicted branch condition matches the Cmov condition, then the flag is marked as no-speculate and is executed sequentially through the fetch-decode-execute cycle. In an implementation, if the recorded predicted branch condition does not match the Cmov condition the Cmov instruction overwrites the address of the MAR holding the current recorded predicted branch condition to point to a zero address, and since the zero address is invalid no data is loaded on a branch mispredict. In both implementations, the Cmov instruction flag in step 822 indicates speculative load hardening in the source code of the software 302 in the first block 306 which initiates step 816. In step 816, the indication of the Cmov instruction flag in step 822 indicates the utilization of speculative load hardening within the source code of the first block 306 and therefore the intent to protect sensitive data that may be loaded on the conditional branch within the first block 306, this indication is relayed back to the processor 102 as an instruction to automatically suppress hardware speculative execution.

In an implementation, if in step 820 no Cmov instruction flag is identified, then in step 824 this method of speculative load hardening may not be implemented in the source code of the first block 306 and hardware speculative execution may be employed by the processor 102. In step 826, the decode circuit 204 may load the predicted branch condition so that subsequent instructions in the second block 308 may be executed concurrently during the fetch-decode-execute cycle being run on the first block 306.

Embodiments may achieve advantages as described below. For example, if the method of speculative load hardening utilized within the source code of a software 302 is known, then the processor 102 may utilize specific processes for identifying where locally within the source code the speculative load hardening is being utilized to protect the intended sensitive load data within the source code and automatically suppress hardware speculative execution on a local level (e.g., the first block 306) to ensure improved security, while still employing hardware speculative execution elsewhere within the source code of the software 302 to ensure improved runtime and program execution efficiencies provided by the processor 102 (e.g., the capabilities of the processors being utilized). Additionally, advantages may be achieved even without having the method of speculative load hardening being utilized within the source code of the software 302 being a preset condition by having the processor 102 detect the security of the environment 402 of individual blocks (e.g., the first block 306) and automatically suppressing hardware speculative execution in unsecure environments to ensure improved security and employing hardware speculative execution when the processor 102 detects the environment 402 of the individual blocks (e.g., the first block 306) to be secure. Even further, advantages may be achieved even when the speculative load hardening being utilized is not a set precondition and the environment 402 of the individual blocks (e.g., the first block 306) is unsecure by having the processor 102 detect both approaches of hardware speculative hardening and automatically suppressing hardware speculative execution if identified within a specific block (e.g., the first block 306) to yield improved security and employing hardware speculative execution when speculative load hardening is not detected within a specific block (e.g., the first block 306). This approach to automatically suppressing hardware speculative execution by identifying speculative load hardening at a local level (e.g., basic block by basic block approach) as opposed to suppressing hardware speculative execution on a global scale across a program allows for the fine tuning of improved efficiency while maintaining desired security for software indicated sensitive load data.

In an implementation, a method may include detecting, by a processor, a speculative load hardening indicator in a first block of code of a software program. Method may also include selectively suppressing, by the processor, hardware speculative execution for instructions in the first block of code associated with the detected speculative load hardening indicator.

The described implementations may also include one or more of the following features. The method where the detected speculative load hardening indicator may include a conditional move instruction. The method where the detected speculative load hardening indicator may include a fence instruction. The method where the speculative load hardening indicator is detected by a decode circuit within the processor during an instruction decode stage. The method where the hardware speculative execution is suppressed on a localized basis within the software program. The method where the first block of code does not include a speculative load hardening indicator and where the method further may include not suppressing the hardware speculative execution of the first block of code. The method may include checking an environment of the first block of code by the processor, and not suppressing the hardware speculative execution of the first block of code based on the environment being an enclave. The method may include identifying, by the processor, a speculative load hardening indicator within a second block of code of the software program, and not suppressing a hardware speculative execution of the second block of code.

In an implementation, a device may include a fetch circuit configured to fetch instructions from a plurality of blocks of code. Device may also include a decode circuit configured to detect a speculative load hardening indicator within a first block of code of the plurality of blocks of code and selectively suppress hardware speculative execution for instructions in the first block of code associated with the detected speculative load hardening indicator. Device may moreover include an execution circuit configured to execute the instructions from the plurality of blocks of code.

The described implementations may also include one or more of the following features. The device where the decode circuit is further configured to check an environment of the first block of code, where when the first block of code is isolated within an enclave the suppression of the hardware speculative execution for instructions in first block of code is not performed. The device where the detected speculative load hardening indicator is a fence instruction. The device where the detected speculative load hardening indicator is a conditional move instruction. The device where the decode circuit is further configured to store a predicted branch prediction in an address register for an identified conditional branch instruction with the first block of code, and when the decode circuit does not detect a speculative load hardening indicator associated with the identified conditional branch instruction, load the predicted branch condition. The device may include a schedule circuit configured to hold the predicted branch condition within the address register. The device where the decode circuit is further configured to identify a speculative load hardening indicator within a second block of code from the plurality of the plurality of blocks of code, and not suppress a hardware speculative execution process on the second block of code. The device may include a schedule circuit configured to suppress hardware speculative execution for instructions in the first block of code associated with the detected speculative load hardening indicator.

In an implementation, a non-transitory computer-readable storage medium storing instructions may include detecting a speculative load hardening indicator in a first block of code. Non-transitory computer-readable storage medium storing instructions may also include selectively suppressing hardware speculative execution for instructions in the first block of code associated with the detected speculative load hardening indicator.

The described implementations may also include one or more of the following features. The non-transitory computer-readable storage medium storing instructions that cause the computing system to perform the operations, where the detected speculative load hardening indicator may include a conditional move instruction or a fence instruction. The non-transitory computer-readable storage medium storing instructions that cause the computing system to perform the operations may include checking an environment of the first block of code, and not suppressing the hardware speculative execution of the first block of code based on the environment being an enclave. The non-transitory computer-readable storage medium storing instructions that cause the computing system to perform the operations may include identifying a speculative load hardening indicator within a second block of code, and not suppressing a hardware speculative execution of the second block of code.

While this invention has been described with reference to illustrative examples, this description is not intended to be construed in a limiting sense. Various modifications and combinations of the illustrative examples, as well as other examples of the invention, will be apparent to persons skilled in the art upon reference to the description. It is therefore intended that the appended claims encompass any such modifications or examples.

What is claimed is:

1. A method comprising:

detecting, by a processor, a conditional branch instruction within a first block of code of a software program;

checking, by the processor, a next flag-consuming instruction following the conditional branch instruction to detect whether a conditional move instruction or fence instruction indicating speculative load hardening is present in the first block of code; and in response to detecting the conditional move instruction or fence instruction indicating speculative load hardening within the first block of code, selectively suppressing, by the processor, hardware speculative execution for instructions in the first block of code;

evaluating, by the processor, instructions within a second block of code to detect that the second block of code does not include a conditional move instruction or fence instruction indicating speculative load hardening; and in response to determining that the second block of code does not include the conditional move instruction or fence instruction indicating speculative load hardening, not suppressing hardware speculative execution for the second block of code.

2. The method of claim 1, wherein the conditional move instruction or fence instruction is detected by a decode circuit within the processor during an instruction decode stage.

3. The method of claim 1, wherein the hardware speculative execution is suppressed on a localized basis within the software program.

4. The method of claim 1, wherein the first block of code does not include a conditional move instruction or fence instruction and wherein the method further comprises not suppressing the hardware speculative execution of the first block of code.

5. The method of claim 1, further comprising:

checking an environment of the first block of code by the processor; and not suppressing the hardware speculative execution of the first block of code based on the environment being an enclave.

6. The method of claim 1, wherein the conditional move instruction or fence instruction was inserted into the first block of code by a compiler implementing speculative load hardening.

7. The method of claim 1, wherein checking the next flag-consuming instruction following the conditional branch instruction comprises determining that the conditional move instruction or fence instruction is being utilized for speculative load hardening purposes rather than other purposes.

8. The method of claim 1, wherein the conditional move instruction or fence instruction is part of target language code generated by a compiler from source code, wherein the target language code comprises the first block of code.

9. A device comprising:

a fetch circuit configured to fetch instructions from a plurality of blocks of code;

a decode circuit configured to:

detect a conditional branch instruction within a first block of code of the plurality of blocks of code;

record a predicted branch condition for the conditional branch instruction;

check a next flag-consuming instruction following the conditional branch instruction to detect whether a conditional move instruction or fence instruction indicating speculative load hardening is present in the first block of code; and in response to detecting the conditional move instruction or fence instruction indicating speculative load hardening within the first block of code, selectively suppress hardware speculative execution for instructions in the first block of code, wherein the predicted branch condition is not loaded for concurrent execution of subsequent instructions;

evaluate instructions within a second block of code of the plurality of blocks of code to detect that the second block of code does not include a conditional move instruction or fence instruction indicating speculative load hardening; and in response to determining that the second block of code does not include the conditional move instruction or fence instruction indicating speculative load hardening, not suppress hardware speculative execution for the second block of code; and an execution circuit configured to execute the instructions from the plurality of blocks of code.

10. The device of claim 9, wherein the decode circuit is further configured to check an environment of the first block of code, wherein when the first block of code is isolated within an enclave, the suppression of the hardware speculative execution for instructions in the first block of code is not performed.

11. The device of claim 9, wherein the decode circuit is further configured to:

store a predicted branch condition in an address register for an identified conditional branch instruction with the first block of code; and when the decode circuit does not detect a speculative load hardening indicator associated with the identified conditional branch instruction, load the predicted branch condition.

12. The device of claim 11, further comprising:

a schedule circuit configured to hold the predicted branch condition within the address register.

13. The device of claim 9, further comprising a schedule circuit configured to:

suppress hardware speculative execution for instructions in the first block of code.

14. The device of claim 9, wherein the conditional move instruction or fence instruction was inserted into the first block of code by a compiler implementing speculative load hardening.

15. A non-transitory computer-readable storage medium storing instructions that, when executed by a computing system, cause the computing system to perform operations comprising:

detecting a conditional branch instruction within a first block of code;

recording a predicted branch condition for the conditional branch instruction;

checking a next flag-consuming instruction following the conditional branch instruction to detect whether a conditional move instruction or fence instruction indicating speculative load hardening is present in the first block of code; and in response to detecting the conditional move instruction or fence instruction indicating speculative load hardening within the first block of code, selectively suppressing hardware speculative execution for instructions in the first block of code, wherein the predicted branch condition is not loaded for concurrent execution of subsequent instructions;

evaluating instructions within a second block of code to detect that the second block of code does not include a conditional move instruction or fence instruction indicating speculative load hardening; and in response to determining that the second block of code does not include the conditional move instruction or fence instruction indicating speculative load hardening, not suppressing hardware speculative execution for the second block of code.

16. The non-transitory computer-readable storage medium of claim 15, storing the instructions that cause the computing system to perform the operations further comprising:

checking an environment of the first block of code; and not suppressing the hardware speculative execution of the first block of code based on the environment being an enclave.

17. The non-transitory computer-readable storage medium of claim 15, wherein the conditional move instruction or fence instruction was inserted into the first block of code by a compiler implementing speculative load hardening.

18. The non-transitory computer-readable storage medium of claim 15, storing the instructions that cause the computing system to perform the operations, wherein checking the next flag-consuming instruction following the conditional branch instruction comprises determining that the conditional move instruction or fence instruction is being utilized for speculative load hardening purposes rather than other purposes.

* * * * *